L. F. HARRIS.
PIPE COUPLING.
APPLICATION FILED MAR. 8, 1918.
1,284,099.
Patented Nov. 5, 1918.
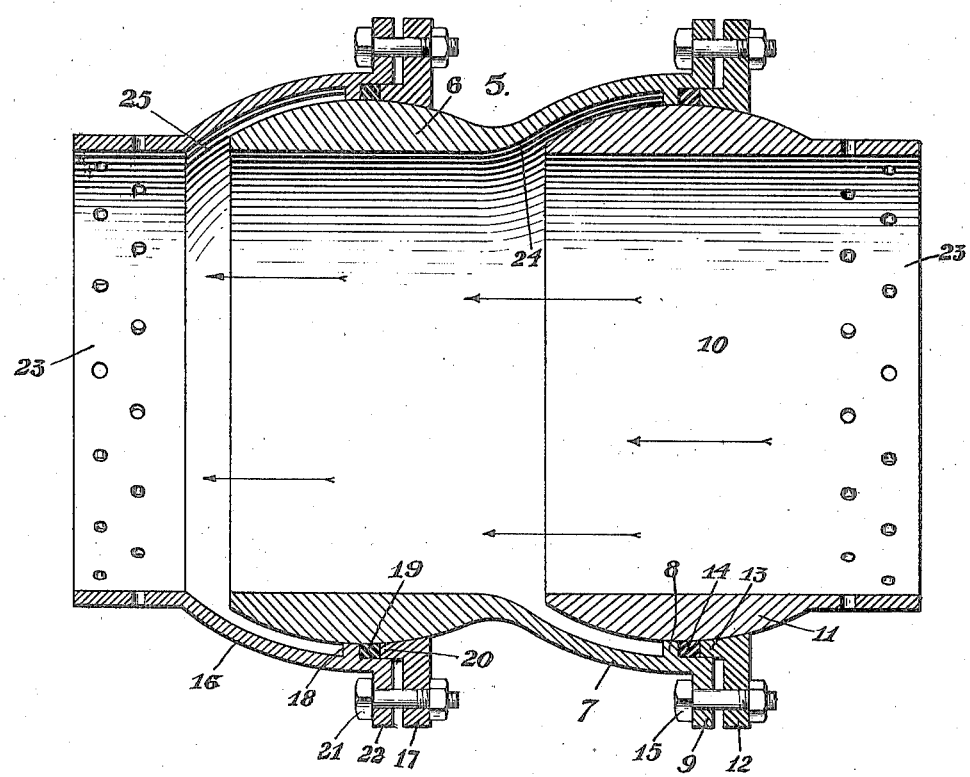

UNITED STATES PATENT OFFICE.

LEWIS F. HARRIS, OF NEWARK, NEW JERSEY.

PIPE-COUPLING.

1,284,099.  Specification of Letters Patent.  Patented Nov. 5, 1918.

Continuation of application Serial No. 45,179, filed August 12, 1915. This application filed March 8, 1918. Serial No. 221,234.

*To all whom it may concern:*

Be it known that I, LEWIS F. HARRIS, a citizen of the United States of America, residing at Newark, in the county of Essex and State of New Jersey, have invented new and useful Improvements in Pipe-Couplings, of which the following is a specification.

This is a continuation of my application for Letters Patent of the United States, No. 45,179, filed by me on the 12th day of August, 1915.

The invention relates primarily to coupling sleeves of that class which are employed for connecting together the adjacent ends of a conduit or outlet pipe sections of a dredge. These sections are usually supported by pontoons or scows and the coupling sleeve is designed whereby the desired degree of flexibility will be had throughout the entire pipe line, in order to permit the latter to accommodate itself to the variations in height of the pontoons and freely respond to movements of the pontoons which are created by water disturbances.

The invention has for its objects the provision of a light, strong and durable coupling sleeve which will quickly adapt itself to all angular movements of the pipe line sections; one which will establish an air and water tight connection between the pipe line sections, and one in which the sleeve will always be provided with a clear passageway for the unobstructed passage of hard objects.

Another object of the invention is to provide a coupling sleeve which will consist of mating sections arranged and designed so as to minimize the possibility of the sleeve clogging by a gravitational return of material in the pipe line when the pump is at rest and for further preventing the material from entering between the sections of the sleeve.

A still further object of the invention is to provide a coupling sleeve which will consist of but few parts, certain of which being of identical formation and gaskets between the different sections of the structure, the said identical parts also mating with the next adjacent sections of the coupling and with said gaskets so as to establish packing glands whereby the joints between the respective sections of the sleeve are flexible to varying adjustments to insure a perfect air and water tight connection at all times.

In the drawing the view represents a vertical longitudinal section through my improved coupling sleeve.

The invention consists of an intermediate section 5, having a ball portion 6, at one side of its center and a socket portion 7, at the other side of the center. The latter is provided with an internal annular flange 8, which is arranged preferably at right angles to the longitudinal axis of the structure. The said flange is located at an appreciable distance within the extreme end of said socket portion 7, and at said extreme end said socket portion is provided with an integral attaching and adjusting flange 9.

Within the socket portion 7, is an end attaching section 10, whose internal diameter is the same throughout and at any point coextensive with the internal diameter of the ball portion of said intermediate section 5. This attaching section is provided with a ball surface 11, which fits within the socket section 7, so as to project through the flange 8. Associated with the flange 9, is a flanged ring 12, having a projecting portion 13, embraced by the inner walls of the portion 7. Interposed between the flange 8, and said projecting portion 13, is a gasket 14. The said flange 9, and ring 12, are adjustably connected together by adjusting devices which are preferably in the form of bolts 15, which are capable of adjustment whereby the portion 13, can be advanced in the direction of the flange 8, to cause the packing gasket or material as the case may be to find proper contact with the ball surface 11. The flange 8, and ring 12, combined with the packing gasket constitute a gland whose walls are the only elements of the sections 5 and 10, which find intimate contact with each other. This feature is desired to be emphasized in order that friction between the sections of the sleeve will be reduced to a minimum. This reduction of friction between the parts permits of a high degree of flexibility to be set up therein.

The ball portion 6, of said intermediate section is fitted in a socket 16, which is substantially identical in construction with the socket portion 7, of said section 5. The internal diameter of the portion 16, agrees exactly with the internal diameter of the portion 7, so that an adjusting ring 17, can be properly mated with said socket section 16, and correlated with an annular internal flange 18, in said section 16. A packing gland 19, is arranged between the flange 18, and projecting portion 20, of the ring 17. Adjusting bolts 21, pass through the flange 22, and through the ring 17, in order that the gasket 19, may be adjusted against the surface of the ball portion 6, to effect an air and water tight joint at this point. The rings 12 and 17, are of identical formation and each is provided with a curved internal surface which conforms exactly with that ball portion of the structure with which it is associated. The sections 10 and 16, of the structure are each provided with an extension 23, adapted to be riveted or otherwise suitably secured in some well known manner to the sections of a pipe line. The extensions 23, are of uniform internal diameters, so as to agree with similar formations of the ball portions 6 and 11. In this manner no appreciable spaces are formed between the respective sections of the coupling, and the possibility of material and heavy objects clogging the sections is reduced to a minimum. The inner extremity of the ball portion 11, of the section 10, projects on to the curved surface 24, of the socket portion 7. The outer end of the ball portion 6, projects toward the surface 25, of the socket 16. The course of movement of material as it passes through the coupling is indicated by the arrows in the drawing. Incident to the position of the ball portions to the surfaces 24 and 25, of the socket portions, the material as it passes through the coupling will be deflected by said surfaces 24 and 25, and the finer materials held from clogging the spaces between the mating sections of said coupling.

What I claim is:

A coupling sleeve for the discharge pipe line of dredging machines comprising an intermediate section provided with a socket portion and a ball portion, a ball section fitting in said socket portion, a socket section fitting the ball portion of said intermediate section, the external diameter of the ball section being identical with that of the ball portion of said intermediate section, the internal diameter of the ball portion of the intermediate section being equal to the internal diameter of said ball section, said internal diameters being cylindrical throughout and of the same size as the pipe line and the end of the ball section opening onto the next adjacent walls of the socket portion of said intermediate section, and means for effecting a fluid tight joint between the respective sections.

In testimony whereof I affix my signature.

LEWIS F. HARRIS.